United States Patent [19]

Sano et al.

[11] Patent Number: 5,104,720

[45] Date of Patent: * Apr. 14, 1992

[54] SURFACE-PATTERNED POLYBUTYLENE TEREPHTHALATE RESIN MOLDED ARTICLES AND PROCESS FOR PREPARING SUCH MOLDED ARTICLES

[75] Inventors: Terutaka Sano; Shigeru Nedzu, both of Shizuoka; Yoichi Ebina, Osaka, all of Japan

[73] Assignee: Polyplastics Co., Ltd., Osaka, Japan

[*] Notice: The portion of the term of this patent subsequent to Nov. 5, 2008 has been disclaimed.

[21] Appl. No.: 548,303

[22] Filed: Jul. 5, 1990

[30] Foreign Application Priority Data

Jul. 5, 1989 [JP] Japan ................................. 1-173840

[51] Int. Cl.⁵ .............................................. B32B 9/00
[52] U.S. Cl. .................................... 428/195; 428/204; 428/206; 428/411.1; 264/129; 8/456; 8/471
[58] Field of Search ............... 264/129; 8/456, 471; 524/98, 281, 539; 428/195, 204, 206, 411.1

[56] References Cited

U.S. PATENT DOCUMENTS

| | | | |
|---|---|---|---|
| 3,270,101 | 8/1966 | Jardine et al. | 264/22 |
| 4,080,360 | 3/1978 | Schlichting et al. | 524/98 |
| 4,131,595 | 12/1978 | Breitenfellner et al. | 524/539 |
| 4,369,280 | 1/1983 | Dieck et al. | 524/281 |
| 4,764,177 | 8/1988 | Sumi et al. | 8/471 |
| 4,820,310 | 4/1989 | Fukui | 8/456 |
| 4,844,851 | 7/1989 | Hotta et al. | 264/129 |

FOREIGN PATENT DOCUMENTS

| | | |
|---|---|---|
| 0311079 | 4/1989 | European Pat. Off. |
| 3738212A1 | 5/1989 | Fed. Rep. of Germany |
| 1234237 | 5/1959 | France |
| 1255820 | 4/1960 | France |
| 1372909 | 10/1963 | France |

OTHER PUBLICATIONS

Patent Abstracts of Japan, vol. 12, No. 274 (M-275)(3121) Jul. 29, 1988 & JP-A-63 056 418 (Hirose Shoji) Mar. 11, 1988.

Primary Examiner—Patrick J. Ryan
Attorney, Agent, or Firm—Nixon & Vanderhye

[57] ABSTRACT

A surface-patterned, injection-molded article of polybutylene terephthalate is produced by placing a film composed mainly of a polybutylene resin and back-printed with a desired graphic and/or indicia pattern in a mold cavity so that the printed surface of the film will be in contact with resin to be injected thereinto. Molten resin composed mainly of polybutylene terephthalate is then injected into the mold cavity to bond the pattern-printed film integrally onto a corresponding surface of the resulting molded PBT article.

14 Claims, 1 Drawing Sheet

SURFACE-PATTERNED POLYBUTYLENE TEREPHTHALATE RESIN MOLDED ARTICLES AND PROCESS FOR PREPARING SUCH MOLDED ARTICLES

CROSS REFERENCE TO RELATED APPLICATIONS

This application is related to commonly owned and copending U.S. application Ser. No. 07/557,719 filed in the name of the same applicants as the present application on Jul. 26, 1990, and U.S. application Ser. No. 07/564,466 filed in the name of the same applicants as the present application on Aug. 9, 1990, the entire content of each said copending application being expressly incorporated herein by reference.

FIELD OF INVENTION

The present invention relates to polybutylene terephthalate resin molded articles having a graphic and/or indicia pattern (including letters, figures, symbols and the like) formed on a surface thereof, and to processes for preparing such molded articles.

BACKGROUND AND SUMMARY OF THE INVENTION

Molded resin articles have been decorated in the past with graphic and/or indicia patterns (such as letters, figures, symbols and the like) using known foil-decorating techniques. According to the foil-decorating technique, a molded surface-patterned article is prepared by placing in a mold cavity a resin film bearing a selected graphic and/or indicia pattern, filling the mold cavity with a molten resin (or a resin prepolymer) and then compressing the thus obtained molded article under heat and pressure to integrate the film onto a surface of the molded article. In the case of thermosetting resins, this heat and pressure treatment serves to cause the resin to react further.

The foil-decorating technique has been used extensively to decorate the surfaces of molded articles formed of thermosetting resins (e.g. melamine resin) with pictorial patterns. However, when thermosetting resins are used to form surface-patterned articles, the steps employed in foil-decorating become relatively complex thereby increasing the costs associated with manufacturing such articles. Accordingly, the use of foil-decorating techniques using thermoplastic resins has recently gained more attention because molded articles of thermoplastic resins are more easily obtained by injection molding techniques, resulting in lower production costs. In this regard, foil-decorated injection-molded articles using polyolefins, such as polypropylene have been commercialized.

The thermoplastic polyolefin resins that have typically been used in foil-decorating techniques generally exhibit poor heat resistance, strength and rigidity. Thus, although these typical resins can be used to form injection-molded articles that may be employed in some end-use applications, they cannot usually be employed in end-use applications where severe conditions may be encountered. In the case of injection-molded tableware, food vessels or trays, for example, a number of additional performance requirements must be met. Specifically, the odor and/or color of food must not migrate into the resin. Conversely the odor and/or "taste" of the resin should not migrate into the food.

Molded articles satisfying all of the foregoing requirements have not been developed to date. It is therefore towards fulfilling such a need that the present invention is directed.

The present invention broadly resides in foil-decorated surface-patterned articles formed of polybutylene terephthalate (PBT) resin. In this regard, PBT resins have not been used previously as a substrate body for foil-decorations.

More specifically, in accordance with the present invention, a process for preparing a surface-decorated polybutylene terephthalate resin molded article (i.e., having a graphic and/or indicia pattern formed on a surface of the article) is especially characterized by placing a film composed mainly of a polybutylene terephthalate resin, and back-printed with the desired pattern, in a cavity of a mold so that the printed surface of the film will be in contact with the subsequently injected resin. Molten resin composed mainly of polybutylene terephthalate is then injected into the mold cavity to fill the same and to integrally bond the pattern-printed film onto the surface of the resulting molded resin article. The resulting equally novel molded article prepared according to this process will thereby have a surface which corresponds to the film, and will exhibit the pattern associated with that film.

BRIEF DESCRIPTION OF THE ACCOMPANYING DRAWINGS

Reference will hereinafter be made to the accompanying drawings wherein like reference numerals throughout the various Figures denote like structural elements, and wherein:

FIG. 1A is a top plan view of a surface-patterned article (tray) employed in the Examples to be discussed below; and FIG. 1B is a cross-sectional side elevation view of the surface-patterned vessel (tray) shown in FIG. 1A as taken along line B—B therein.

DETAILED DESCRIPTION OF THE PREFERRED EXEMPLARY EMBODIMENTS

Figure 1A:
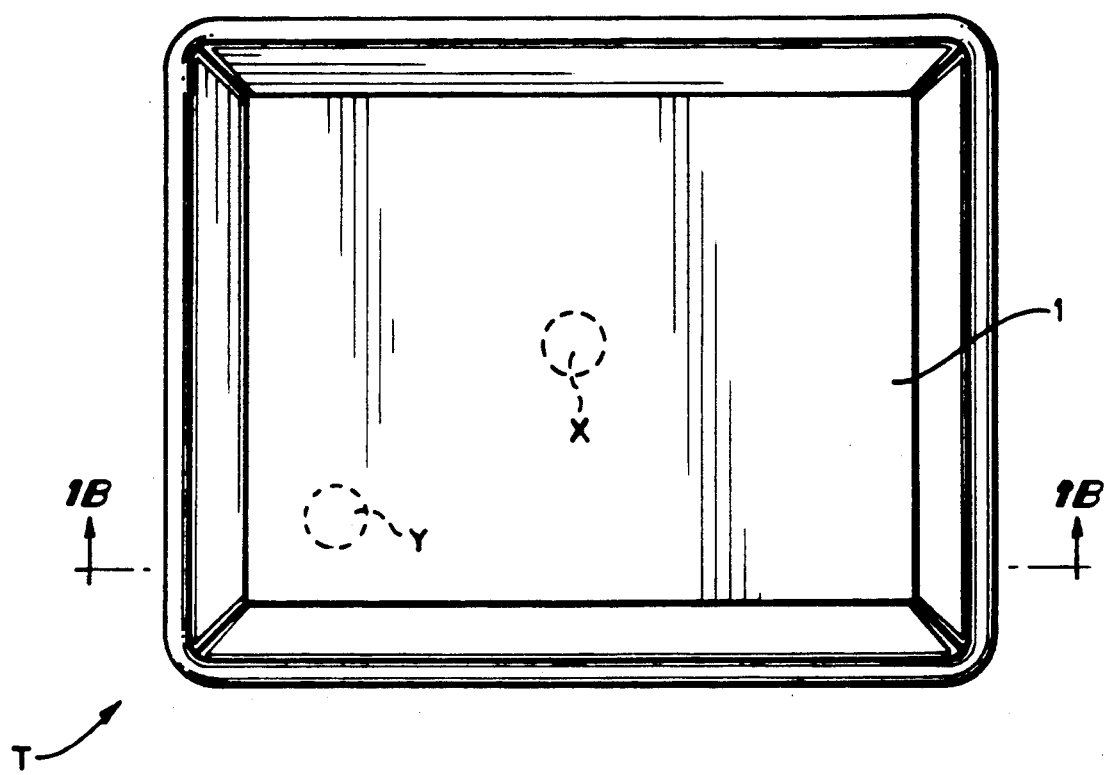

According to the present invention, a film consisting essentially of a polybutylene terephthalate resin and having a pictorial pattern formed thereon is first placed in a cavity of a mold. As is well-known, polybutylene terephthalate resin is typically obtained by condensing 1,4-butanediol with terephthalic acid or an ester-forming derivative thereof. Other resins which are formed mainly of polybutylene terephthalate units may also be used to form the printed film used in accordance with the present invention. For example, copolymers comprised of butylene terephthalate units as their main structural units, or modified products obtained by grafting or crosslinking can be used as the base resin of the film used in the present invention.

Known additives typically employed in thermoplastic resins, for example, stabilizers such as antioxidants and ultraviolet absorbers, plasticizers, antistatic agents, surface active agents, crystallization promoters, inorganic fillers, and other thermoplastic resins, can be blended with the PBT resin depending upon the properties that are desired. When these additives are used, consideration must be given to the additive types and amounts so that the intended effect of the present invention is not diminished. Incorporation of an additive that either degrades the transparency of the film (i.e., colors)

and/or inhibits the film's adhesion to the substrate body of injection-molded resin must especially be avoided.

The film used in the present invention is preferably a so-called "back-printed" transparent film. That is, the film used is one where the desired pattern is reverse-printed on the film's back surface so that the intended pattern is visibly perceptible when the film is observed from the film's front surface (i.e., through the film's thickness).

The pattern-printed film may be placed in the mold cavity using electrostatic charging or vacuum techniques. In the former technique, the film is electrostatically charged opposite to the mold so that strong electrostatic attraction forces will assist in the placement of the film in the mold cavity. In the latter technique, a vacuum is drawn between the film and the mold to cause the film to be drawn into conformance with the mold surface. By these techniques, reliable placement of the film within the mold cavity is assured.

The thickness of the film is not particularly critical. However, if the thickness of the film is too small, there is a risk that the film will break or wrinkle when the molten resin is injected into the mold cavity. On the other hand, if the thickness of the film is too large, the film loses its transparency thereby degrading the sharpness of the back-printed pattern. Accordingly, it is preferred that the thickness of the film be between 30 to 150 µm, especially between 50 to 100 µm.

The temperature of the mold at which the film is placed is likewise not particularly critical. However, in order to produce excellent adhesion between the film and the injected resin, it is preferred that the mold temperature be between 50° to 150° C., especially between 50° to 100° C.

With the film properly placed in the mold cavity (i.e., at a position corresponding to that portion of the resulting injection-molded article's surface intended to bear the pattern film), the molten PBT resin is then injected into the mold cavity so as to fill the same. The patterned film is thus bonded and integrated to the injected resin by the heat energy and pressure of the injection molding process. As noted above, the injection molded resin is composed mainly of polybutylene terephthalate and preferably is similar to the resin that forms the back-printed film.

Materials typically added to ordinary thermoplastic resins can also be incorporated into the PBT resin forming the substrate body. Examples of such additives include those mentioned above with respect to the patterned film, as well as flame retardants, flame retardant assistants, pigments and fibrous, plate-shaped or powdery fillers such as glass fibers, carbon fibers, glass flakes, mica powder, glass beads or talc powder.

Conditions ordinarily adopted for the injection molding of polybutylene terephthalate resins, such as the temperatures of the mold and resin, the injection pressure, and/or the injection speed can be adopted as the the conditions used for injection-molding the molten PBT resin into the film-lined mold cavity according to the present invention. It has been found that, in order to improve the adhesion between the printed film and the substrate body, it is preferred that the resin temperature be elevated, and that the injection speed be lowered. However, if the resin temperature is too high, resin decomposition and/or film deterioration ensues. In view of the foregoing, it is preferred that the resin temperature be between 20°-60° C. (preferably between 25°-50° C.) greater than the melting point of the base resin constituting the film. In this way, the greater temperature of the injection molded PBT resin will cause the film in the mold cavity to at least partially plasticize (melt) thereby forming an integral bond with the injection-molded PBT substitute body. If the injection speed is too low, the resin's moldability is drastically degraded. In view of the balance between the adhesion and moldability, it is thus preferred that the injection speed be between 0.5 to 3.0 m/min, especially between 1.0 to 2.0 m/min.

It has also been found that the size and position of the gate influences the finished state (e.g. film tearing and/or wrinkling) of the surface-patterned molded article having a pictorial pattern formed thereon. From this viewpoint, it is preferred that a single-point gate be used and that the gate be disposed on a side of the mold opposite to the film and in confronting relationship generally at the film's center.

The size of the gate depends on the size of the molded article and the size of the film that forms the pattern. In this regard, it is preferred that the cross-sectional area of the gate be between 1.5 to 300 $mm^2$, especially between 7 to 200 $mm^2$. The geometric shape of the gate is not particularly critical. Thus, circular, ellipsoidal, square and rectangular gate shapes can be appropriately adopted according to the shape of the molded article and/or the shape of the pattern-printed film. If the pattern-printed film is relatively long and narrow, a special gate such as a film gate can be adopted. Furthermore, in the case where a number of films are used to impart desired patterns to a single molded article, it is preferred that a respective gate be provided for each printed film used.

The surface-patterned injection-molded polybutylene terephthalate resin article which is prepared according to the above-mentioned process exhibits good adhesion between the film and the PBT resin substrate body as well as a good surface appearance.

Moreover, the surface-printed injection-molded article of polybutylene terephthalate of the invention exhibits excellent resistance to heat and hot water, as well as improved strength and rigidity properties not possessed by conventional foil-decorated molded articles. Accordingly, new end uses of foil-decorated molded articles can be developed due to the present invention. The molded articles of the present invention are further characterized in that no odor migration between the food and the molded article occurs. Therefore, the molded articles of the present invention may be suitably used as tableware, food vessels, or food trays.

EXAMPLES

The present invention will now be described in detail with reference to the following non-limiting Examples.

In the following Examples, film adhesion was evaluated by the following square-cut peeling test (according to JIS K-5400). In this regard, square cuts were formed at intervals of 2 mm between a region close to the gate (i.e., region X in FIG. 1A) and a region distant from the gate (i.e., region Y in FIG. 1A). A tape was then applied to the film and peeled away. Film adhesion was evaluated based on the number of film squares that were removed, with the result being expressed by the number of removed squares per 100 squares).

EXAMPLES 1 THROUGH 7

Figure 1B:
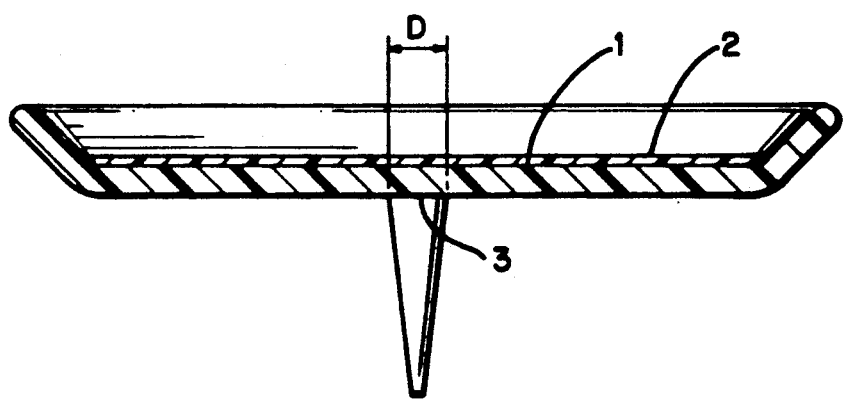

Molded articles in the form of a tray T (250 mm × 200 mm × 3 mm) having a pictorial pattern film 1 integrally bonded on an inner surface of the tray's flat portion 2 as shown in FIGS. 1A and 1B were prepared under various molding conditions specified in Table 1. A polybutylene terephthalate film (having a thickness of 70 or 40 μm and a melting point of 228° C.) back-printed with a pictorial pattern was used as the pattern film 1 for imparting a pictorial pattern to tray T, while a polybutylene terephthalate resin was used as the resin to be injection molded to form the tray T. The results of evaluations for these molded articles are shown in Table 1.

TABLE 1

|  | Ex. 1 | Ex. 2 | Ex. 3 | Ex. 4 | Ex. 5 | Ex. 6 | Ex. 7 |
|---|---|---|---|---|---|---|---|
| Molding conditions |  |  |  |  |  |  |  |
| mold temperature (°C.) | 70 | 70 | 70 | 70 | 70 | 55 | 70 |
| resin temperature (°C.) | 260 | 260 | 260 | 260 | 250 | 260 | 260 |
| injection speed (m/min) | 1.5 | 1.5 | 1.5 | 2.5 | 1.5 | 1.5 | 1.5 |
| gate size (mm$^2$)*$^4$ | 28 | 13 | 5 | 28 | 28 | 28 | 28 |
| Film thickness (μm) | 70 | 70 | 70 | 70 | 70 | 70 | 40 |
| Results |  |  |  |  |  |  |  |
| warping and deformation | not | not | not | not | not | not | not |
| appearance (surface state)*$^1$ | 10 | 10 | 8 | 9 | 10 | 10 | 8 |
| appearance (adhesion of film) | good | good | good | good | good | good | good |
| appearance after heating*$^2$ | 10 | 10 | 8 | 9 | 10 | 10 | 8 |
| appearance after hot water treatment*$^3$ | 10 | 9 | 7 | 7 | 9 | 9 | 7 |
| peel test of cut squares |  |  |  |  |  |  |  |
| point X | 0/100 | 0/100 | 10/100 | 4/100 | 2/100 | 0/100 | 0/100 |
| point Y | 0/100 | 0/100 | 6/100 | 6/100 | 5/100 | 2/100 | 0/100 |

Notes for Table 1
*$^1$sharpness of the pictorial pattern and warping or wrinkling of the film were collectively checked and appearance was qualitatively evaluated by a 10-point method where 10 is the best and 1 is the worst.
*$^2$appearance after heating at 100° C for 1 hour (the surface state and adhesion of the film) was checked and qualitatively evaluated by the 10-point method noted above
*$^3$appearance after hot water treatment at 95° C for 1 hour (i.e. surface state and adhesion of the film) was checked and qualitatively evaluated by the 10-point method noted above
*$^4$size at the intersection of the tray (i.e., the location identified by reference numeral 3 in FIG. 1). In each Example, a single-point gate having a circular cross-sectional shape and diameter D was disposed at a point confronting the center of the film.

EXAMPLE 8 AND COMPARATIVE EXAMPLE 1

In order to examine odor migration that may occur in the case of tableware, food vessels or the like, a cylindrical vessel having a diameter of 100 mm, a depth of 50 mm and a thickness of 2 mm was molded using either a polybutylene terephthalate resin (Example 8) or a polypropylene resin (Comparative Example 1). The vessels were filled with water or oil and heated at 95° C. In the case of the vessel composed of the polybutylene terephthalate resin, odor migration was not detected. In the case of the vessel composed of the polypropylene resin, an olefin odor was recognized in the vessel's contents.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A surface-patterned injection-molded polybutylene terephthalate resin article comprised of a substrate body which consists essentially of polybutylene terephthalate resin, and a transparent thermoplastic film having a predetermined thickness and a selected pattern printed upon a surface thereof, said film being integrally bonded to a surface region of said substrate body such that said printed surface of said film is positioned adjacent said predetermined substrate body surface whereby said printed pattern is visible through the thickness of the film.

2. A surface-patterned injection-molded article as in claim 1, wherein said film consists essentially of a polybutylene terephthalate resin.

3. A surface-patterned injection-molded article as in claim 1, in the form of tableware, a food vessel, or a food tray.

4. A process for preparing an injection-molded surface-patterned polybutylene terephthalate article comprising placing a film consisting essentially of polybutylene terephthalate and back-printed with a desired pattern into a mold such that the unprinted side of the film is in contact with the mold surface and the back-printed side of the film is exposed to the mold cavity, and then injecting molten polybutylene terephthalate resin into the mold cavity so as to contact the back-printed side of the film, and allowing the film to integrally bond to the injection-molded polybutylene terephthalate resin.

5. A process as in claim 4, wherein said step of injecting the polybutylene terephthalate resin includes using a single point gate having a cross-sectional area of between 1.5 to 300 mm$^2$.

6. A process as in claim 5, wherein said step of injecting the polybutylene terephthalate resin includes positioning the gate so as to be in opposing relationship to a central portion of the film in the mold cavity.

7. A process as in claim 4 or 6, wherein wherein the thickness of the back-printed film is between 30 to 150 μm.

8. A process as in claim 7, wherein the step of injection-molding is practiced such that the molten polybutylene resin has a temperature that is between 20° to 60° C. greater than the melting point of the back-printed film.

9. A process as in claim 8, wherein the step of injection molding is practiced using a mold temperature of between 50° to 150° C.

10. A process as in claim 9, wherein the step of injection-molding is carried out at a molten polybutylene terephthalate injecting speed of between 0.5 to 3.0 m/min.

11. A process for producing an injection-molded polybutylene terephthalate article having a pattern on at least a selected surface portion thereof, said process comprising:

lining a region of a mold cavity corresponding to said selected surface portion of the article with a rear surface-printed thermoplastic film by placing the front surface of the film against the mold so that the rear surface of the film is exposed to the mold cavity; and then injecting a polybutylene terephthalate resin into the film-lined mold cavity so as to form said article with a pattern on said selected surface portion thereof, wherein said polybutylene terephthalate resin is injected into said mold cavity at a temperature greater than a melt temperature of said thermoplastic film lining said mold cavity region to at least partially plasticize said thermoplastic film and integrally bond the same to said injected polybutylene terephthalate resin.

12. A process as in claim 8, wherein said polybutylene terephthalate resin is injected into said mold cavity at a temperature that is between 20° to 60° C. greater than the melt temperature of said thermoplastic film.

13. A process as in claim 11 or 12, wherein said thermoplastic film consists essentially of polybutylene terephthalate resin.

14. A process as in claim 13, wherein said film is transparent.

* * * * *

UNITED STATES PATENT AND TRADEMARK OFFICE
CERTIFICATE OF CORRECTION

PATENT NO. : 5,104,720
DATED : April 14, 1992
INVENTOR(S) : Terutaka SANO, et al It is certified that error appears in the above-identified patent and that said Letters Patent is hereby corrected as shown below:

Column 3, line 38, delete "." and insert --,--.

Column 3, line 57, delete "the" (second occurrence).

Column 6, Claim 7, line 1, delete "wherein" (second occurrence).

Signed and Sealed this

Twentieth Day of July, 1993

Attest:

MICHAEL K. KIRK

*Attesting Officer*  Acting Commissioner of Patents and Trademarks